US006668629B1

(12) United States Patent
Leslie (10) Patent No.: US 6,668,629 B1
(45) Date of Patent: Dec. 30, 2003

(54) METHODS AND APPARATUS FOR WEB-ENABLED ENGINE-GENERATOR SYSTEMS

(75) Inventor: David S. Leslie, Wheaton, IL (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 09/629,516

(22) Filed: Aug. 1, 2000

Related U.S. Application Data (60) Provisional application No. 60/167,602, filed on Nov. 26, 1999.

(51) Int. Cl.⁷ .................................................. G01L 3/26

(52) U.S. Cl. ........................................................ 73/116

(58) Field of Search ....................... 73/116; 340/825.06; 318/563

(56) References Cited

U.S. PATENT DOCUMENTS

| | | |
|---|---|---|
| 3,902,076 A | 8/1975 | Meyers et al. |
| 4,731,547 A | 3/1988 | Alenduff et al. |
| 4,755,798 A | 7/1988 | Hooper |
| 4,912,382 A | 3/1990 | Koenig et al. |
| 5,390,068 A | 2/1995 | Schultz et al. |
| 5,574,654 A | 11/1996 | Bingham et al. |
| 5,608,657 A | 3/1997 | Conway et al. |
| 5,650,936 A | 7/1997 | Loucks et al. |
| 5,736,847 A | 4/1998 | Van Doorn et al. |
| 5,754,033 A | 5/1998 | Thomson |

FOREIGN PATENT DOCUMENTS

| | | |
|---|---|---|
| GB | 2 252 629 A | 8/1992 |
| JP | 62113076 | 5/1987 |
| JP | 05328616 | 12/1993 |

OTHER PUBLICATIONS

Product Information Pamphlet from Basler Electric dated 6/97.
Product Information Pamphlet from ASCO.
Product Information Pamphlet entitled System 200 Generator Control; dated Jul. 1, 1997.
Engine Monitoring System/Controller with Remote Communications Capabilities by Frank W. Murphy Manufacturer; dated Jan. 11, 1999.
Controls & Instrumentation by Frank W. Murphy Manufacturer; Condensed Catalog No. 28.
Product Information Pamphlet entitled First In Advanced Generator Controls and Alarm Modules.
GENCON® II—Standby V1–7h High Performance Generator–Set Controller by Wexler Computer Systems Development LTD; dated 1993–1994.
Product Information Pamphlet entitled Electronic Control Equipment by Modex Automation.
Product Information Pamphlet from Deep Sea Electronics Ltd.
Description of the AC Power Monitor System by EXOR Electronic R&D—ACPM System Nov. 21, 1997—Ver. 1.04.

(List continued on next page.)

*Primary Examiner*—Edward Lefkowitz
*Assistant Examiner*—Maurice Stevens
(74) *Attorney, Agent, or Firm*—Karl A. Vick, Esq.; Armstrong Teasdale LLP (57) ABSTRACT

A controller for controlling and monitoring the operation of an engine-generator is disclosed. The controller includes a central processing unit, a power supply, an input/output system, a communication system, an annunciation system and mode control switches. The operational status of the engine-generator is displayed on a liquid crystal display and logged in a data storage system or communicated to an external system using a communications interface. The controller also incorporates a monitoring system.

69 Claims, 5 Drawing Sheets

OTHER PUBLICATIONS

Product Information Pamphlet entitled Onan by Cummins.

Product Information Pamphlet entitled The UniOP Family of Operator Interfaces by EXOR® Electronic R & D.

Product Information Pamphlet entitled The Complete Windows CE® Engine only from EXOR.

Product Information Pamphlet entitled Industrial Computers by EXOR®.

Product Information Pamphlet entitled First, a breakthrough GenSet.Now, an innovative application.

Product Information Pamphlet entitled PowerCommand™ Paralleling Digital MasterControl Infinite Bus Applications by Cummins Power Generation.

Product Information Pamphlet entitled Model 50 PowerCommand™ Paralleling Interface Enclosure for Isolated bus applications by Cummins Power Generation.

Product Information Pamphlet entitled Model 100 MasterControl PowerCommand™ Paralleling for Isolated bus applications by Cummins Power Generation.

Product Information Pamphlet entitled Model 150 PowerCommand™ Automatic Paralleling Interface Isolated Bus System Controller Range: 40 to 1600 kVA Sets by Cummins Power Generation.

Product Information Pamphlet entitled PowerCommand™ Paralleling System Overview by Cummins Power Generation.

Product Information Pamphlet entitled 'Power Control' PCL System Generator Set Control by Cummins Power Generation.

Product Information Pamphlet by Turner Electric Corporation.

Product Information Pamphlet by Spectrum Detroit Diesel; Series ISAS.

Product Information Pamphlet by Spectrum Detroit Diesel; Generator Accessories.

Product Information Pamphlet entitled Onan PowerCommand Digital Paralleling Sample Specification Guide; dated Aug. 1, 1995.

Product Information Pamphlet entitled Distributed Power by Siemens dated May/Jun. 2000.

Product Information Pamphlet by Hardware Datasheet entitled Generator Power Control for Single Generator Applications.

Notification of Transmittal of the International Search Report or the Declaration—Filed Mar. 6, 2001.

International Search Report.

Figure 1:
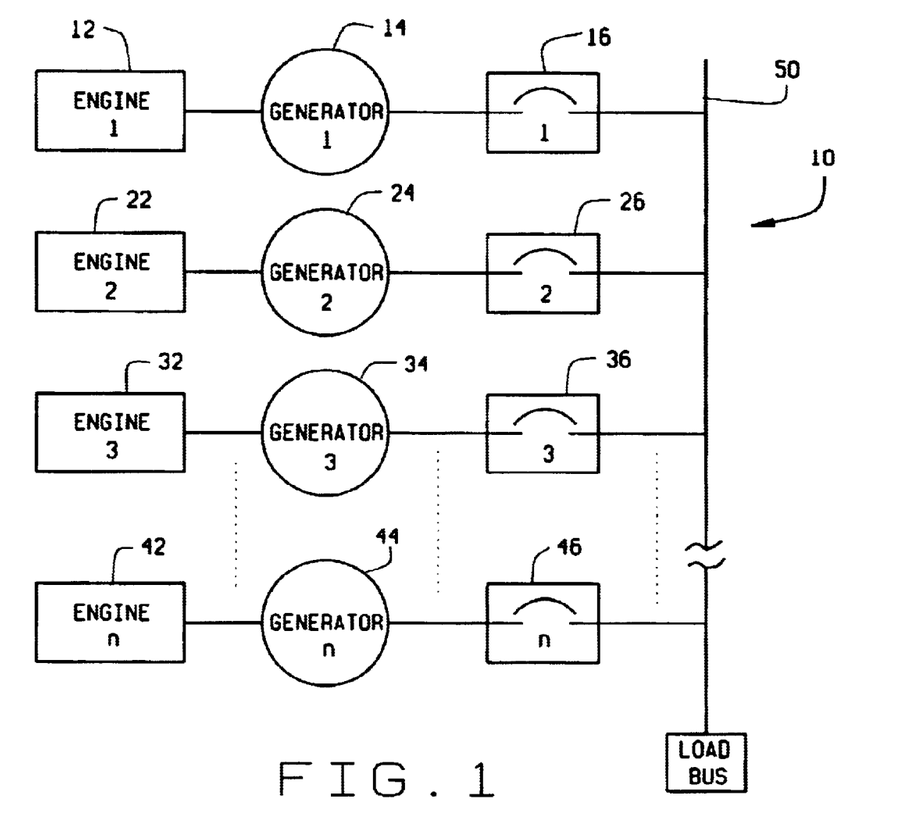
FIG. 1 is a block diagram of an electrical power generation system utilizing multiple engine-generators electrically linked together as the source of electrical energy.

FIG. 7 ial power generation system 10 utilizing multiple engine-generator sets as a source of electrical energy. Each engine and electrical generator set comprises an engine, an electrical generator, and a circuit breaker. In the embodiment shown in FIG. 1, n engine-generator sets are shown where the engines and generators are mechanically linked together. Circuit breakers electrically link the outputs of the n generators. n engine-generator sets are shown in FIG. 1 to illustrate that depending on the required capacity of the electrical power generation system there may be more or less than three engine-generator sets within the system. Again referring to FIG. 1, a first engine-generator set includes a first engine 12, a first generator 14, and a first

METHODS AND APPARATUS FOR WEB-ENABLED ENGINE-GENERATOR SYSTEMS

CROSS REFERENCE TO RELATED APPLICATIONS

This application claims the benefit of U.S. Provisional Application No. 60/167,602, filed Nov. 26, 1999, which is hereby incorporated by reference in its entirety.

BACKGROUND OF THE INVENTION

This invention relates generally to control and monitoring systems, and more particularly to microprocessor based controllers and monitoring systems.

Engine-generator sets are used to provide an on-site alternate source of electrical energy in hospitals, offices, data centers, factories, institutions, hotels and other buildings where an interruption to the utility source of power may cause unsafe situations or which may result in economic loss. In addition, engine-generator sets may be used to provide electrical energy in remote areas where there is no utility power available. Engine-generator sets may also be used as a distributed source of electrical energy, to reduce the peak load on utility electrical generation systems during peak electrical demand periods, for example, during the summer.

Typically, the engine-generator set is sent a signal to start automatically by an engine-generator control system, without manual intervention, for example upon loss of utility power or at the beginning of a peak demand period. When the engine-generator set develops an abnormal operating condition or malfunction during operation, or when the power generated by the engine-generator set is no longer required, for example upon restoration of utility power or at the end of the peak demand period, the engine-generator set is sent a signal to shutdown by an engine-generator control system.

Known engine-generator controllers use microprocessors to control the operation of an engine-generator set and in some cases provide or have interfaces to annunciation equipment, such as incandescent lights or light emitting diodes to display the status and operating condition of the engine-generator. Those known engine-generator controllers have fixed input/output capabilities and control and monitor the engine-generator using hard-wired discrete control wiring. Thus, known engine-generator controllers are unable to monitor or display the actual operational parameters of the engine-generator, oil pressure or oil temperature for example.

It is difficult to expand the input/output capabilities of known engine-generator controllers without the use of special hardware and custom programming. In addition, known engine generator controllers are unable to operate over a range of input control voltages and have no network communication capabilities. Also, known engine-generator controllers are unable to display the power quality of electrical energy generated by the engine-generator. In addition, known engine-generator controllers lack a real-time clock and data storage and retrieval system and are therefore unable to log the operational status of the engine-generator set.

Therefore, it would be desirable to provide an integrated controller which can be configured and expanded to match unique requirements for an on-site installation, without the need for special hardware or custom programming.

It is also desirable to provide a controller with communication capabilities for direct communications with a control system and for providing monitoring capabilities so that the operational status of the controller and the system controlled can be closely monitored, and where communication protocols of the controller are easily changed by substitution of communications circuit cards.

In addition it would be desirable to provide a real-time clock, and a data storage and retrieval system so that the operational data from the controller may be retrieved using a wired or wireless communication system.

Finally, it would be desirable to provide a web-enabled controller so that operational data can be accessed, retrieved, and controlled through the Internet.

BRIEF SUMMARY OF THE INVENTION

The invention includes a microprocessor based engine generator controller that controls the starting and stopping of an engine-generator set, and provides the capability to view the status of the controller and engine-generator, in a stand alone configuration or as part of a web-based application. The method for such control includes configuring the engine-generator controller for the control application, monitoring parameters of the engine-generator controller, monitoring operational status of the system under control of the engine-generator controller, and storing a status of the engine-generator under control of the controller. Further, the controller communicates with the engine-generator over a communications bus, which allows the controller to display the actual values of the operating parameters of the engine-generator under control.

DETAILED DESCRIPTION OF THE INVENTION

Referring now to FIG. 1, there is illustrated a block diagram of an electrical power generation system 10 utilizing multiple engine-generator sets as a source of electrical energy. Each engine and electrical generator set comprises an engine, an electrical generator, and a circuit breaker. In the embodiment shown in FIG. 1, n engine-generator sets are shown where the engines and generators are mechanically linked together. Circuit breakers electrically link the outputs of the n generators. n engine-generator sets are shown in FIG. 1 to illustrate that depending on the required capacity of the electrical power generation system there may be more or less than three engine-generator sets within the system. Again referring to FIG. 1, a first engine-generator set includes a first engine 12, a first generator 14, and a first circuit breaker 16. A second engine-generator set includes a second engine 22, a second generator 24, and a second circuit breaker 26. A third engine-generator set includes a third engine 32, a third generator 34, and a third circuit breaker 36. An $n^{th}$ engine-generator set includes an $n^{th}$ engine 42, an $n^{th}$ generator 44, and an $n^{th}$ circuit breaker 46. The electrical energy of each engine-generator set is linked via circuit breakers to a common electrical bus 50 which is connected to a load bus for the distribution of electricity. In a typical engine-generator system as shown in FIG. 1, each engine-generator set is controlled and monitored as described below.

Figure 2:
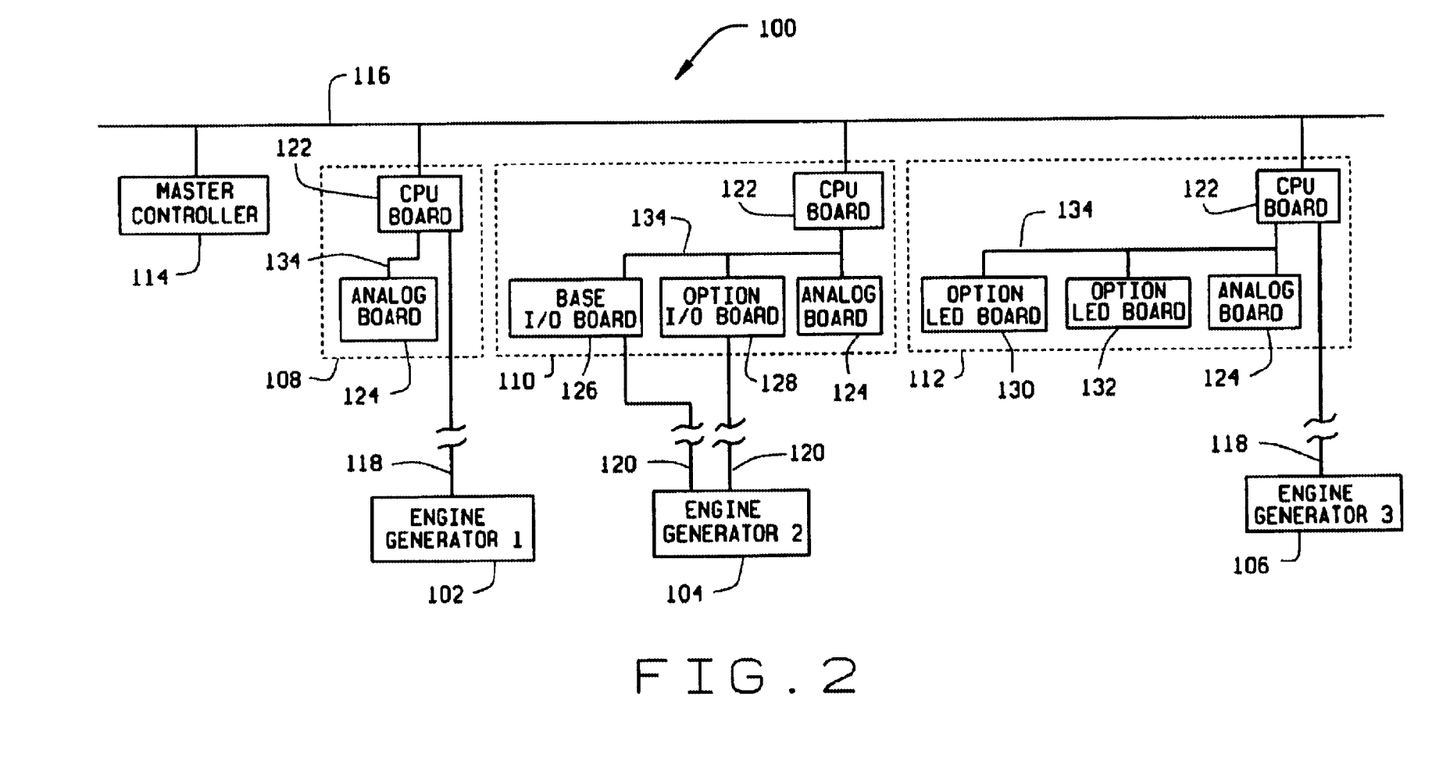
FIG. 2 is a block diagram of visual engine-generator controllers remote from the engine-generator sets.

In FIG. 2 there is shown a block diagram 100 of an electrical power generation system employing three engine-generator sets 102, 104, and 106. Each engine-generator is controlled by a visual engine-generator controller 108, 110 and 112. Overall control of the power generation system is under the supervisory control of a master controller 114 which in one embodiment, is a programmable logic controller (PLC) or other microprocessor based device. Master controller 114 communicates messages and sends and retrieves data from each visual engine-generator controller 108, 110 and 112 via a high speed communication bus 116. In one embodiment, high speed communication bus 116 is an ethernet network using an unshielded twisted pair cable. High speed communication bus 116 may also utilize an RS-485 network using a shielded twisted pair cable. Depending on the configuration of the system and the type of engine-generator sets 102, 104, and 106, visual engine-generator controllers 108, 110 or 112 control and monitor engine-generator set 102, 104 or 106, respectively, using an RS-485 network 118 or by using hard-wired discrete control wiring 120. As represented in FIG. 2, by using network protocols such as an RS-485 network, and control wiring 120, controllers 108, 110, and 112 are located remote from engine-generators 102, 104, and 106.

As shown in FIG. 2, visual engine-generator controllers 108, 110, and 112 are configurable with major sub-systems as generally illustrated in block diagram 100. First visual engine-generator controller 108 includes a central processing unit (CPU) and memory, display, and power supply system 122 (hereafter referred to as a CPU Board), and a data acquisition and storage system comprising an analog input sub-system 124 (hereafter referred to as an analog input board). Second visual engine-generator controller 110 includes a CPU board 122, an analog input board 124, a discrete input/output (I/O) sub-system comprising base input/output sub-system 126 (hereafter referred to as base I/O), and an optional input/output sub-system 128 (hereafter referred to as an option I/O board). Base I/O 126 and option I/O board 128 are typically functionally equivalent though base I/O 126 is physically located on CPU board 122 and option I/O board 128 is a separate circuit board inserted into a controller.

Third visual engine-generator controller 112 includes a CPU board 122, an analog input board 124, an annunciation system including a liquid crystal display (LCD), touch screen (not shown), and light emitting diode (LED) annunciator sub-systems 130 and 132 (hereafter referred to as an option LED Board). All engine-generator controllers include a communication system (described below) comprising a network communications sub-system and serial communications sub-system.

Visual engine-generator controller has several embodiments as illustrated above, depending on the specific requirements of each power generation system. A minimum configuration for one embodiment of the visual engine-generator controller is a CPU Board 122 and an analog input board 124, shown in FIG. 2 as first visual engine-generator controller 108. Visual engine-generator controllers 108, 110, 112 are configurable with various combinations of option I/O boards 128 and option LED boards 130 and 132 and analog input boards 124.

CPU Board 122 communicates with analog input boards 124, option I/O board 128 and option LED boards 130 or 132, in one embodiment using an RS-485 network 134. Visual engine-generator controllers 108, 110, and 112 are configured to communicate with respective engine-generators 102, 104, and 106 either over a serial communications link 118 or by using hardwired discrete wiring 120.

Figure 3:
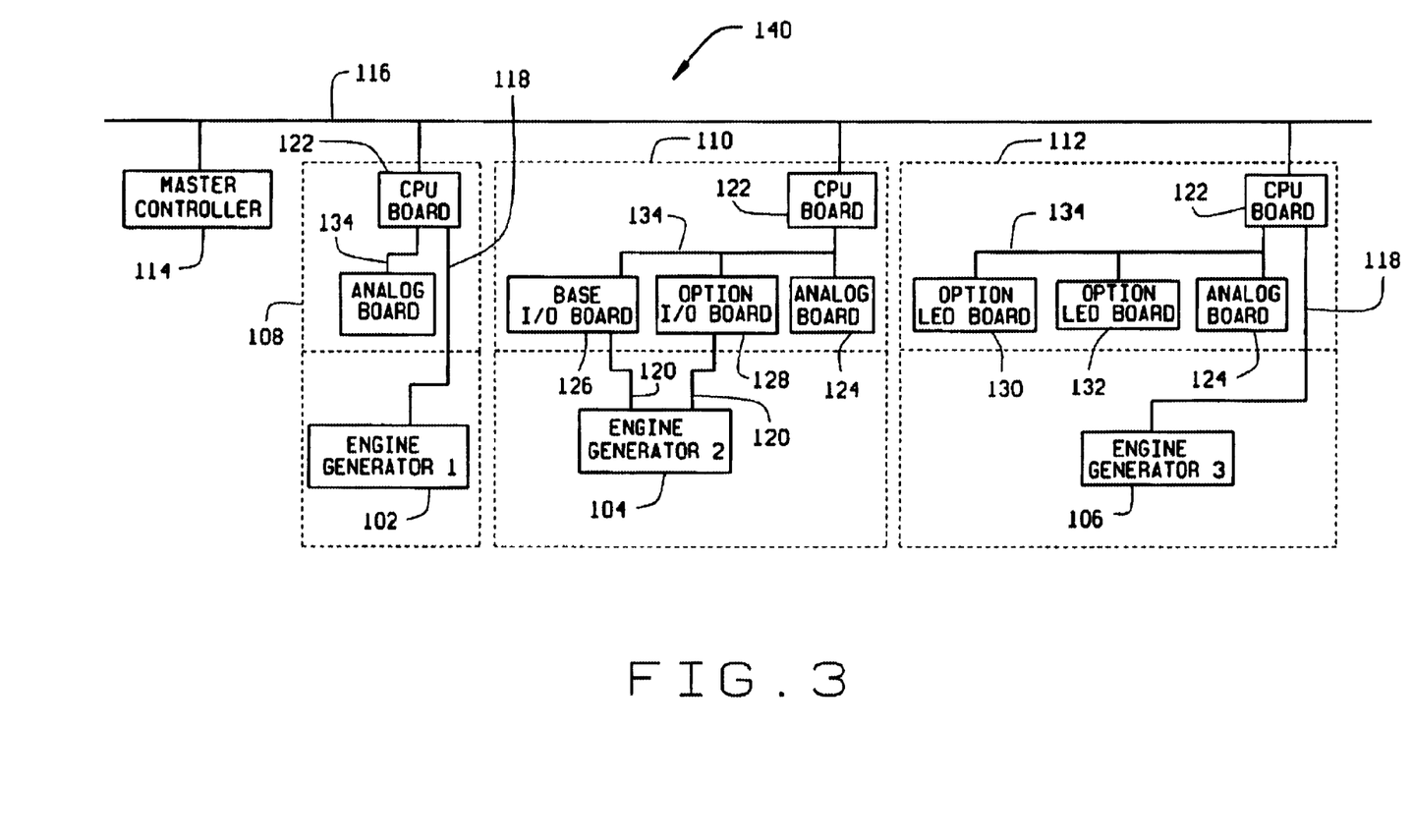
FIG. 3 is a block diagram of visual engine-generator controllers co-located with the engine-generator sets.

Referring now to FIG. 3, a block diagram 140 is shown of an electrical power generation system employing three engine-generator sets 102, 104, and 106. Each engine-generator is controlled by a visual engine-generator controller 108, 110 and 112. Diagram 140 is electrically equivalent to diagram 100 shown in FIG. 2. The difference between diagram 140 and diagram 100 is that in diagram 140 controller 108 is co-located with engine-generator 102, controller 110 is co-located with engine-generator 104, and controller 112 is co-located with engine-generator 106.

Figure 4:
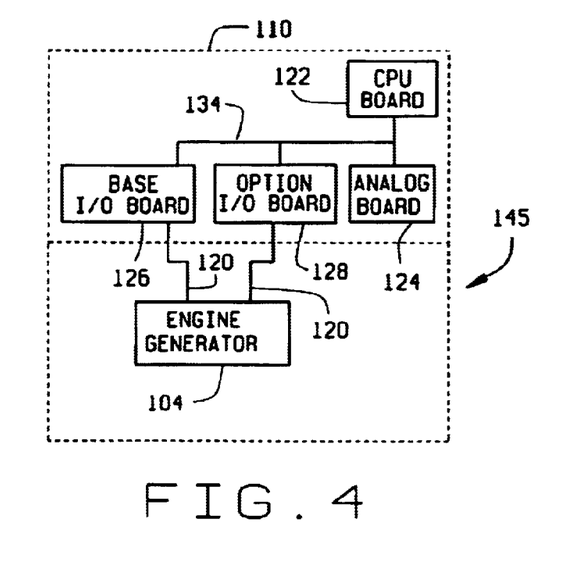
FIG. 4 is a block diagram of a visual engine-generator controller and an engine-generator in a stand alone configuration.

FIG. 4 is a block diagram 145 of a single controller 110 and a single engine generator 104 (both previously shown in FIGS. 2 and 3) in which visual engine-generator controller is used in a stand alone configuration. It is observed that any of the controllers 108, 110, and 112 and engine-generator sets 102, 104, and 106, shown in FIGS. 2 and 3, can be operated in a stand alone configuration, and as described above, the controller is either co-located with the engine-generator or located remote from the engine generator.

Figure 5:
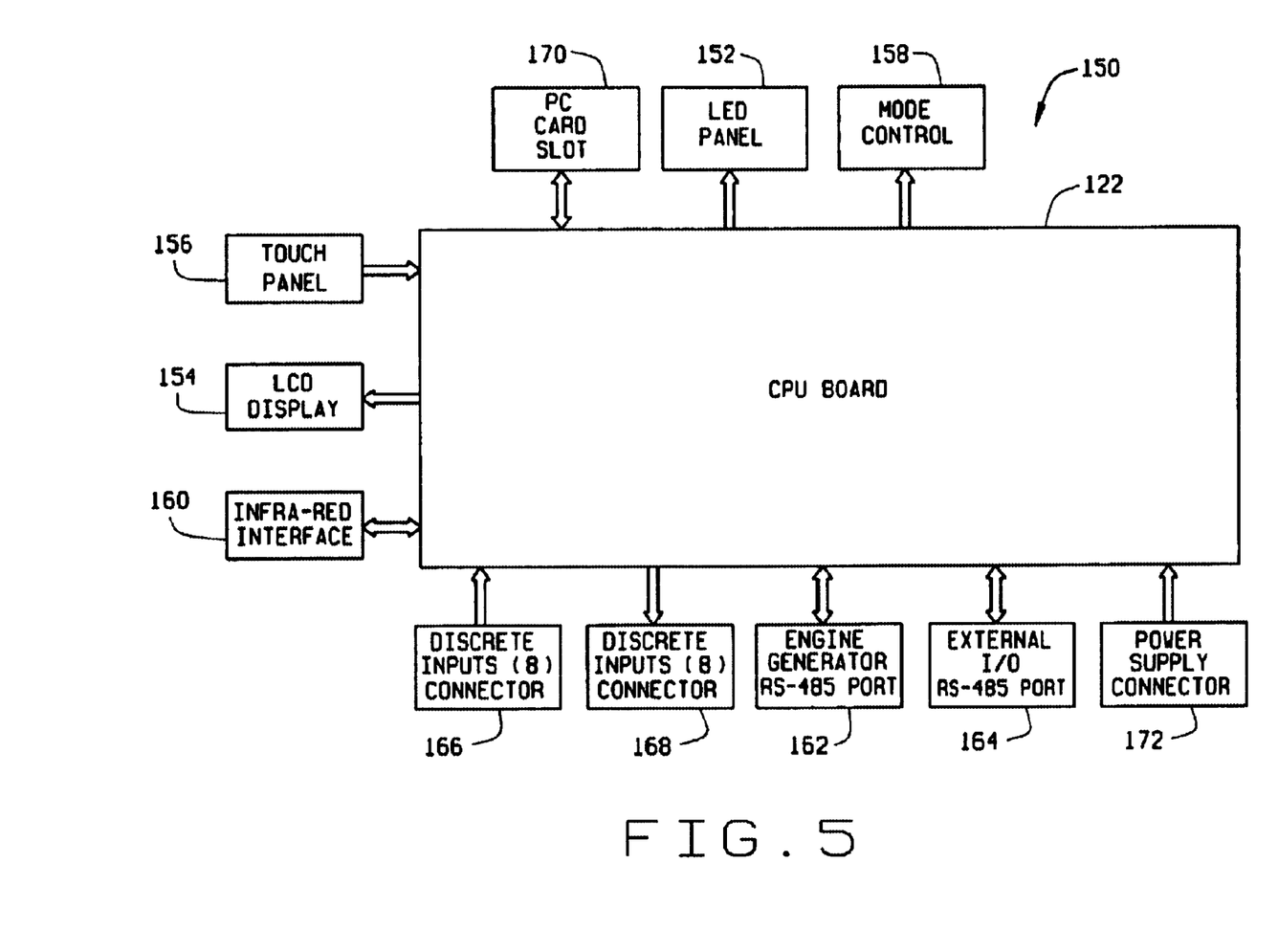
FIG. 5 is a block diagram of inputs and outputs to a visual engine-generator controller CPU board.

Referring now to FIG. 5, a block diagram 150 is shown showing input, output and peripheral connections to the CPU Board 122 (also shown in FIG. 2). Operational status of the visual engine-generator controller, in one embodiment, is indicated by operational status LEDs located on LED panel 152. When the visual engine-generator controller is operational, an LED on LED panel 152 is illuminated. In addition, current engine-generator status is displayed on a liquid crystal display (LCD) 154. Operator input to the visual engine-generator controller is achieved through touch panel 156, mode control switches 158 used to set certain controller operating parameters, an infra-red wireless interface 160, or through external web-based communications as described below. Wireless interface 160, in an alternative embodiment, is a radio frequency interface. Communication with engine-generators utilizing a serial communications port is achieved through engine-generator RS-485 port 162. Communication with analog input board 124, option I/O board 128 and option LED boards 130 and 132 is achieved through external I/O RS-485 Port 164. Hardwired interface with other components necessary to make a complete and operable engine-generator control system is made through discrete inputs connector 166 and discrete outputs connector 168. External network communication to allow each engine-generator controller (shown in FIG. 2) to communicate with a master controller 114 is achieved by inserting an appropriate PC circuit card, for example, an Ethernet card, into PC card slot 170. A modem, Flash RAM card or other PC card compliant peripherals may also be inserted into PC card slot 170 giving visual engine-generator controller versatility. Input power is connected to power supply connector 172.

In one embodiment of the invention, the controllers are used to monitor performance parameters of the engine-generator sets. Voltage and current transformer secondary windings are connected to analog inputs of analog input boards 124 of the engine-generator controllers. Primary windings of the voltage and current transformers are connected to the electrical power output of the engine-generator to monitor the engine-generator output voltages and currents. If the voltages being generated are small enough, connections may be made directly to analog voltage inputs without the use of the voltage transformers. Engine-generator speed is detected by applying a signal from the magnetic pick-up of the engine-generator sensing flywheel speed to an analog input of analog input board 124 configured as a magnetic pickup input.

Figure 6:
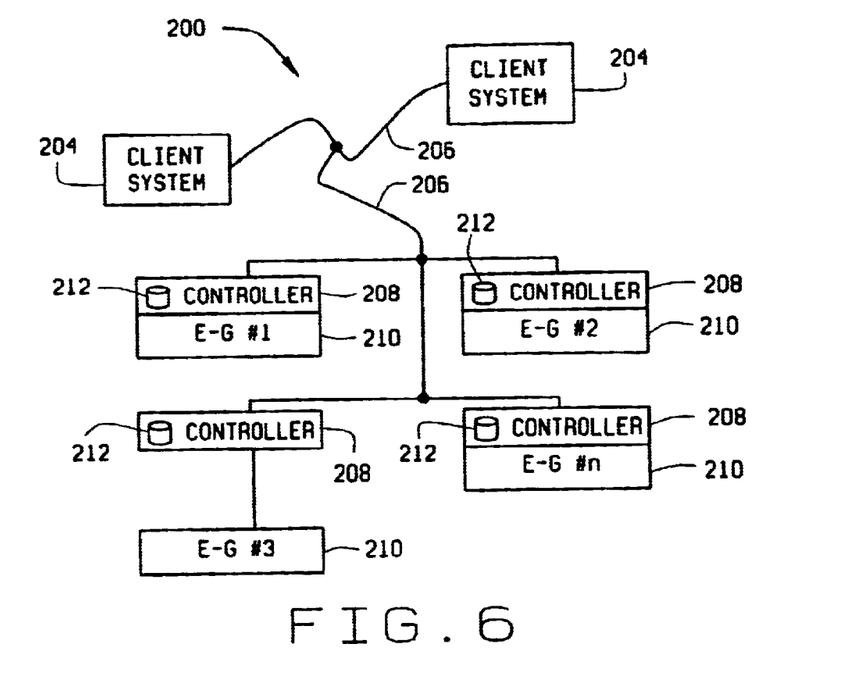
FIG. 6 is a block diagram of a engine-generator control system.

FIG. 6 is a block diagram of an engine-generator control system 200 in accordance with one embodiment of the present invention. System 200 includes at least one thin client system 204 connected through a network 206 to at least one visual engine-generator controller 208. In system 200, controllers 208 each provide web-enabled monitoring and control capabilities for individual engine-generators 210 which are each coupled to a controller 208. As shown in FIG. 6, a user is able to communicate with a plurality of engine-generator controllers 208 via client systems 204 using protocols of network 206. System 200 includes four engine-generator sets 210 each controlled by an engine-generator controller 208, with controller 208 and engine-generator 210 either co-located or in remote locations. In one embodiment, thin client system 204 is a computer including a web browser, but may be any client system capable of being interconnected to network 206 through many interfaces including dial-in-connections, cable modems, special high-speed ISDN lines and networks such as local area networks (LANs) or wide area networks (WANs), including an intranet or the Internet. Client system 204 could be any client system capable of interconnecting to the Internet including a web based digital assistant, a web-based phone or other web-based connectable equipment. Each controller 208 is configured with an engine generator control program, an embedded web server and associated web pages and further includes a database 212 configured to store, for example, information concerning operating parameters, abnormal conditions, alarms, trends, alerts, and other reports of engine-generators 210, herein referred to as operational status, and can be accessed for retrieval of information and for updating of, for example, desired operating parameters by users through web pages at one of client systems 204 by logging onto one of controllers 208. Because of the communications capabilities in the engine-generator controllers described earlier, operation is transparent to the controllers whether the controllers be part of a server based network, as described in FIG. 6 or operated as stand alone units, as described in FIG. 2.

Figure 7:
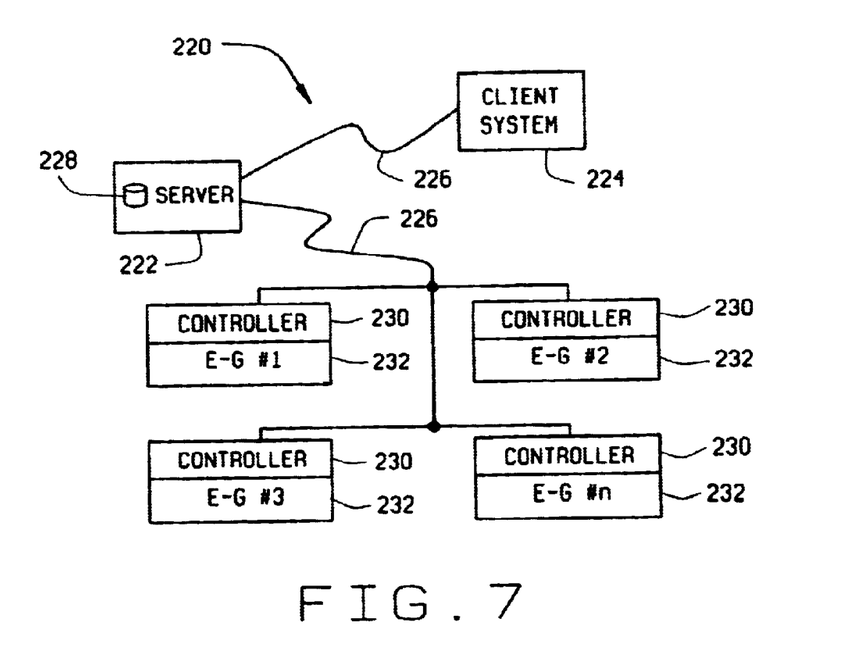
FIG. 7 is a block diagram of an alternative embodiment of an engine-generator control system.

An alternative embodiment is shown in FIG. 7, in which a system 220 includes at least one client-server system 222. Client server system 222 and, optionally, at least one client system 224, are connected to network 226 through many possible interfaces including dial up connections, special high speed ISDN lines, cable modems, switchers or routers. In one embodiment, client-server system 222 is a computer including a database 228 and a software engine to periodically, or when manually directed, retrieve data from one or more visual engine-generator controllers 230 connected to network 226, and then store the retrieved data in database 228. Database 228 is configurable to contain other information related to engine-generators 232, such as but not limited to, model number, serial number, part numbers, installation location, address, telephone number and any other information necessary for the efficient operation and maintenance of engine-generators 232. Client system 224, via client-server system 222, can access, retrieve and view data in database 228 enabling a user to prepare reports and conduct data analysis. Client-server system 222 is also configurable with an E-business enabling software agent capable of ordering consumables, spare parts, and services for engine-generators 232 from other computer systems accessible via network 226. Client-server system 222 can also perform periodic internal health checks and internal diagnostics and update software and firmware on engine-generator controller 230. Client-server system 222 can also perform predictive analysis of engine-generator controller 230 and engine-generator 232 to forecast expected life of a component or failure of a component so that client-server system 222 can request or order the appropriate part or service from other computer systems accessible or connected to network 226. Client-server system 222 is further configurable with an enabling server for transmitting data to client system 224. Although not shown in FIG. 7, it is to be understood that visual engine generator controllers 230 and engine-generators 232 are not restricted to co-location and may be separately located and interconnected via communications networks as described and shown in FIG. 6.

Although not shown in FIG. 6 or FIG. 7, connections established between client system 204 and engine-generator controller 208 may use standard sockets or secure socket layer protocols passed over network 206. In addition, messages may be encrypted using 40 bit encryption or 128 bit encryption.

The term microprocessor, as used herein, refers to microprocessors, microcontrollers, reduced instruction set circuits (RISC), application specific integrated circuits (ASICs), logic circuits, and any other circuit or processor capable of executing the programs described above.

The methods and apparatus as described herein for the control and monitoring of an engine-generator system should not be construed as so limited. The control of an engine-generator is but one example of web-based monitoring and control. Other examples of systems to be monitored and controlled via web-based systems include, but are not limited to electrical switching systems, robotic controllers, heating, ventilation, and air conditioning (HVAC) systems, lighting systems, other factory automation equipment such as ovens, sprayers, and the like. Internal factory utility controls which control distribution of power throughout a factory setting are controlled and monitored in the manner described above. Monitoring of external utilities such as water, sewer, electric and gas is performed via the web.

Expansion to residential use is also possible. Such a monitoring and control system is applicable to appliance control, climate control, security systems and sprinkler systems.

While the invention has been described in terms of various specific embodiments, those skilled in the art will recognize that the invention can be practiced with modification within the spirit and scope of the claims.

What is claimed is:

1. A method for controlling and monitoring operation of at least one engine-generator using a controller, said method comprising the steps of:

configuring the controller for the specific engine-generator set;

monitoring conditions to control operation of the at least one engine-generator set;

monitoring operational status of the engine-generator; and storing a status of the engine-generator including a real-time clock to time tag the stored status.

2. A method according to claim 1 wherein said step of monitoring operational status of the engine-generator further comprises the step of monitoring the engine-generator for abnormal operating conditions.

3. A method according to claim 1 wherein said step of monitoring operational status of the engine-generator further comprises the step of displaying abnormal operating conditions of the engine-generator on a display within the controller.

4. A method according to claim 1 wherein said step of monitoring conditions further comprises the step of reading a state of mode control switches used to set operating parameters of the controller.

5. A method according to claim 1 wherein said step of monitoring operational status of the engine-generator further comprises the step of communicating serially with the controller.

6. A method according to claim 5 wherein said step of communicating serially with the engine-generator further comprises the step of communicating with the engine-generator using an RS-485 based serial communications protocol.

7. A method according to claim 1 wherein said step of monitoring operational status of the engine-generator further comprises the step of downloading operational status over a network to a client system.

8. A method according to claim 1 wherein said step of monitoring operational status of the engine-generator further comprises the step of uploading operational status over a network to a server.

9. A method according to claim 1 wherein said step of storing a status of the engine-generator further comprises the step of storing the engine-generator status within a database within the controller.

10. A method according to claim 1 wherein said step of storing a status of the engine-generator further comprises the step of storing the engine-generator status within a database on a server.

11. A method according to claim 1 wherein said step of monitoring operational status of the engine-generator further comprises the step of uploading performance parameters to a client system.

12. A method according to claim 1 wherein said step of monitoring operational status of the engine-generator further comprises the step of uploading performance parameters to a server.

13. A method according to claim 1 wherein said step of configuring the controller further comprises the step of entering parameters from a touch panel located on the controller.

14. A method according to claim 1 wherein said step of configuring the controller further comprises the step of entering parameters using mode control switches located on the controller.

15. A method according to claim 1 wherein said step of monitoring operational status further comprises the step of monitoring LED indicators and a LCD located on the controller.

16. A method according to claim 1 wherein said step of monitoring operational status of the engine-generator set further comprises the step of monitoring power quality of the power generated by the engine-generator set.

17. A method according to claim 1 wherein said step of monitoring operational status of the engine-generator set further comprises the step of displaying power quality of the power generated by the engine-generator set on a display within the engine-generator controller.

18. A controller configured to control and monitor operation of at least one engine-generator, said controller comprising:
- a central processing unit and memory for processing instructions;
- a data acquisition and storage system;
- a real-time clock to time tag the stored status;
- a communications interface including a wireless communication interface;
- an annunciation system; and
- a plurality of mode control switches.

19. A controller according to claim 18 wherein said controller is further configured for an engine-generator application by reading a state of said mode control switches.

20. A controller according to claim 18 further configured to monitor the engine-generator for abnormal operating conditions.

21. A controller according to claim 18 further configured to display abnormal operating conditions of said engine-generator on a display within said controller.

22. A controller according to claim 18 wherein the real-time clock time tags the stored status.

23. A controller according to claim 18 further configured to monitor conditions to control the engine-generator.

24. A controller according to claim 18 further configured to monitor operational status of the engine-generator and store a status of the engine-generator.

25. A controller according to claim 18 further configured to communicate serially with an external device.

26. A controller according to claim 25 further configured to communicate with said external device using an ethernet network communications protocol.

27. A controller according to claim 25 further configured to communicate with said external device using an RS-485 based serial communications protocol.

28. A controller according to claim 18 wherein said data acquisition controller comprises circuitry for receiving and sending analog and binary data.

29. A controller according to claim 18 wherein said annunciation system comprises at least one of a graphical liquid crystal display (LCD), a touch screen, and a light emitting diode panel.

30. A controller according to claim 18 further configured to upload operational status of said controller over a network to a client system.

31. A controller according to claim 18 further configured to upload operational status of said controller over a network to a server.

32. A controller according to claim 18 further comprising a database for storing a status for an engine-generator.

33. A controller according to claim 18 further configured to download parameters from a client system.

34. A controller according to claim 18 further configured to download parameters from a server.

35. A controller according to claim 18 further comprising a touch panel configured for entry of performance parameters for the engine-generator.

36. A controller according to claim 18 further configured to read a state of said mode control switches and operate according to a set of performance parameters based upon the read position of said mode control switches.

37. A controller according to claim 18 wherein said wireless communication interface comprises at least one of an infra-red and radio frequency communication interface.

38. A controller according to claim 18 further configured as an engine-generator controller.

39. An engine-generator controller according to claim 38 further configured to monitor power quality of the power generated by an engine-generator set.

40. An engine-generator controller according to claim 38 further configured to display power quality of the power generated by an engine-generator set on a display within said engine-generator controller.

41. A control system for controlling and monitoring operation of at least one engine-generator, said system comprising:

at least one client system comprising a browser;

at least one controller configured with a control program including a real-time clock to time tag the stored status and a database for storage of operating parameters of said at least one engine-generator; and a network connecting said client system and said controller.

42. A control system according to claim 41 wherein said at least one controller is further configured as a web server and includes associated web pages.

43. A control system according to claim 41 wherein said network is one of a local area network (LAN) and wide area network (WAN).

44. A control system according to claim 43 wherein said WAN is one of an intranet or the Internet.

45. A control system according to claim 41 wherein said network comprises one of wired and wireless communications circuitry.

46. A control system according to claim 45 wherein said wireless communication circuitry comprises one of infra-red and radio frequency communication circuitry.

47. A control system according to claim 41 wherein said client system is configured to connect to said network through at least one of a dial-in connection, cable modem and a high speed ISDN line.

48. A control system according to claim 41 wherein said client system is at least one of a computer, a web-based digital assistant, and a web-based phone.

49. A control system according to claim 41 wherein control system is configured as an engine-generator control system.

50. A control system for controlling and monitoring operation of at least one engine-generator, said system comprising:

a server;

at least one controller configured with a control program including a real-time clock to time tag the stored status; and a network connecting said server and said controller, said network including one of wired and wireless communications circuitry.

51. A control system according to claim 50 wherein said server further comprises an E-commerce enabling software agent.

52. A control system according to claim 50 further comprising at least one client system connectable to said network and further comprising a browser.

53. A control system according to claim 52 wherein said server further comprises an enabling server for transmitting data to said client system.

54. A control system according to claim 50 wherein said network is one of a local area network (LAN) and wide area network (WAN).

55. A control system according to claim 54 wherein said WAN is one of an intranet or the Internet.

56. A control system according to claim 54 wherein said client system and said server are configured to connect to said network through at least one of a dial-in connection, cable modem and a high speed ISDN line.

57. A control system according to claim 54 wherein said client system is at least one of a computer, a web-based digital assistant, and a web-based phone.

58. A control system according to claim 53 wherein said wireless communication circuitry comprises one of infra-red and radio frequency communication circuitry.

59. A control system according to claim 50 wherein said server further comprises a database for storage of engine-generator operational parameters and other information related to engine-generators.

60. A control system according to claim 59 wherein said system is configured as an engine-generator control system.

61. A web-enabled engine-generator system comprising:

at least one engine-generator set;

at least one server including a real-time clock;

at least one client system; and a network connecting said engine-generator set, said server and said client clock is used to time tag a stored status of the generator set system, said network includes a wireless communications interface.

62. A web-enabled engine-generator system according to claim 61 wherein said engine-generator system further comprises a controller configured to interface to said network, providing web-enabled monitoring and control capabilities for said system.

63. A web-enabled engine-generator system according to claim 62 wherein said client system and said engine-generator controller are configured with a web browser.

64. A web-enabled engine-generator system according to claim 62 wherein said client system and said engine-generator controller are configured with at least one of a dial in connection, a cable modem, a switcher, a router, and a high-speed ISDN line.

65. A web-enabled engine-generator system according to claim 62 wherein said controller configured to communicate operating conditions and performance parameters of said engine-generator set to said network.

66. A web-enabled engine-generator system according to claim 65 wherein said wireless communications interface is at least one of infra-red and radio frequency.

67. A web-enabled engine-generator system according to claim 61 wherein said network is at least one of a local area network (LAN) and a wide area network (WAN), said WAN being at least one of an intranet or the Internet.

68. A web-enabled engine-generator system according to claim 61 wherein said client system further comprises at least one of a web-enabled digital assistant and a web-enabled phone.

69. A web-enabled engine-generator system according to claim 61 wherein said system is configured to order consumables, spare parts and services for said engine-generator sets from another system accessible through or connected to said network.

* * * * *

UNITED STATES PATENT AND TRADEMARK OFFICE
CERTIFICATE OF CORRECTION

PATENT NO. : 6,668,629 B1
DATED : December 30, 2003
INVENTOR(S) : David S. Leslie It is certified that error appears in the above-identified patent and that said Letters Patent is hereby corrected as shown below:

Column 10,
Line 13, delete "53 wherein" and insert therefor -- 50 wherein --.
Line 28, delete "interface." and insert therefor -- interface wherein the real-time clock is used to time tag a stored status of the generator set. --.
Line 47, delete "65 wherein" and insert therefor -- 61 wherein --.

Signed and Sealed this

Twenty-ninth Day of November, 2005

JON W. DUDAS
*Director of the United States Patent and Trademark Office*